United States Patent
Wehunt et al.

(10) Patent No.: US 8,660,926 B1
(45) Date of Patent: *Feb. 25, 2014

(54) SYSTEM FOR AUTOMATICALLY TRANSFERRING ACCOUNT INFORMATION, SUCH AS INFORMATION REGARDING A FINANCIAL SERVICES ACCOUNT

(71) Applicant: JPMorgan Chase Bank, N.A., New York, NY (US)

(72) Inventors: Nathan P. Wehunt, Everett, WA (US); Jeanne Blair, Edmonds, WA (US); Scott A. Lux, Seattle, WA (US); Jeffrey Gradwohl, Gresham, OR (US); Steven J. Dickinson, Everett, WA (US); Helen Boyles, Kenmore, WA (US); Christian M. Houssiere, Irvine, CA (US); Audra K. Stoll, Newport Beach, CA (US); Tara L. Jacobson, Mukilteo, WA (US); Gregory L. Cunningham, Seattle, WA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,597

(22) Filed: Jan. 31, 2013

Related U.S. Application Data

(63) Continuation of application No. 13/290,721, filed on Nov. 7, 2011, now Pat. No. 8,392,305, which is a continuation of application No. 12/955,134, filed on Nov. 29, 2010, now Pat. No. 8,055,564, which is a continuation of application No. 11/332,651, filed on Jan. 13, 2006, now Pat. No. 7,844,519, which is a continuation of application No. PCT/US2005/021546, filed on Jun. 17, 2005.

(60) Provisional application No. 60/581,056, filed on Jun. 18, 2004.

(51) Int. Cl.
*G06Q 40/00* (2012.01)

(52) U.S. Cl.
USPC .................................. 705/35; 705/38; 705/39

(58) Field of Classification Search
USPC ........................................................... 705/35
See application file for complete search history.

(56) References Cited

U.S. PATENT DOCUMENTS

2003/0225688 A1* 12/2003 Dobbins ........................ 705/39
2005/0021456 A1* 1/2005 Steele et al. ................... 705/39

OTHER PUBLICATIONS

Christoph M.F Frank ( Independent Study—Account aggregation (http://www.google.com/scholar?hl=en&lr=&q=cache:tMZ78GIBGnsJ:www.tu-bs.de/~y0010778/account.pdf+automatic+switching+of+old+bank+account+into+a+new+account, pp. 1-75), p. 12, p. 28, and p. 29).*

* cited by examiner

*Primary Examiner* — Ojo O Oyebisi
(74) *Attorney, Agent, or Firm* — Hunton & Williams LLP

(57) ABSTRACT

A system for transferring a customer's account information from one account to a new account is described. The system utilizes a switch kit application and associated system that can determine services at the old account and facilitate the transfer of these services to the new account.

24 Claims, 2 Drawing Sheets

SYSTEM FOR AUTOMATICALLY TRANSFERRING ACCOUNT INFORMATION, SUCH AS INFORMATION REGARDING A FINANCIAL SERVICES ACCOUNT

CROSS-REFERENCE TO RELATED APPLICATION(S)

This application is a continuation of U.S. application Ser. No. 13/290,721, filed Nov. 7, 2011, which is a continuation of U.S. application Ser. No. 12/955,134, filed Nov. 29, 2010 (now U.S. Pat. No. 8,055,564), which is a continuation of U.S. application Ser. No. 11/332,651, filed Jan. 13, 2006 (now U.S. Pat. No. 7,844,519), which is a continuation of International Application No. PCT/US2005/021546 filed Jun. 17, 2005, which claims the benefit of U.S. Provisional Application No. 60/581,056 filed Jun. 18, 2004, all of which are incorporated by reference herein in their entireties.

BACKGROUND

Automation has spread from within financial institutions, to networking among financial institutions, and now to consumers themselves. Consumers or bank customers can now electronically access information and make changes to their accounts via devices such as automatic teller machines (ATMs) and networked computers. For example, customers may access their accounts online (via the Internet) if they have access to a computer and associated software (such as web browser software). Customers can not only transfer funds via their own computers, but also pay bills and conduct other transactions once they have provided the appropriate information or otherwise set up their online account to perform such transactions.

When a customer moves from one bank to another, however, some problems can arise. Transferring bank account information from one or more financial institutions to a new financial institution require customers to manually close their old bank accounts and to manually reestablish previously existing services at their new bank accounts. Under the new bank accounts, customers manually reestablish information, such as their list of bill pay payees, bill pay payment schedule, scheduled transfers, electronic bills ("eBills"), and automatic debits and credits. The process of manually reestablishing old bank account services at the new bank account can be inefficient and can waste time, energy, and resources. Additional problems, of course, exist.

DETAILED DESCRIPTION

Figure 1:
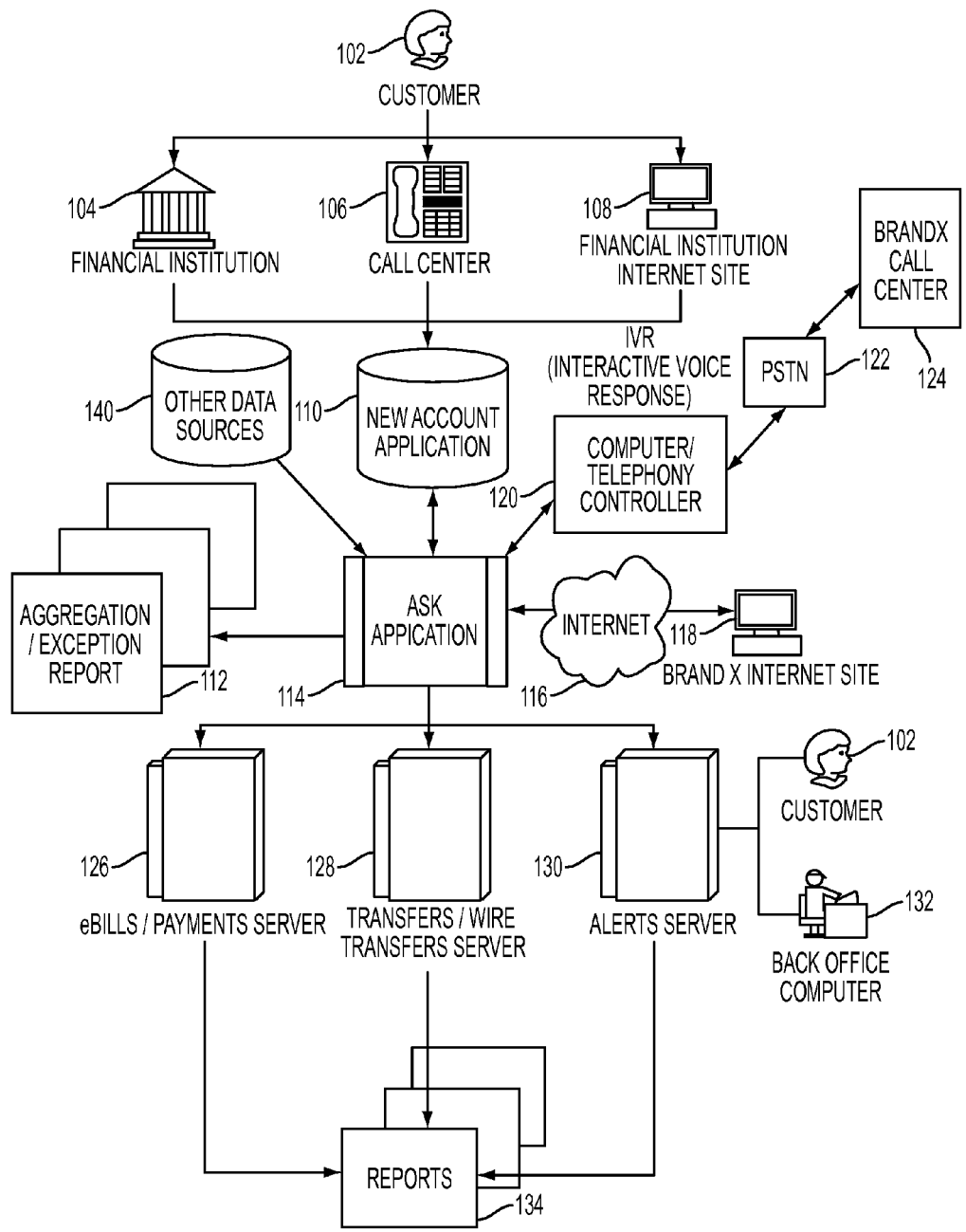
FIG. 1 illustrates a block diagram of components for a system for transferring account information and protocols from a BrandX financial institution to another institution.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Embodiments of the invention relate to a system for transferring a customer's accounts from one or more financial institutions to another institution, such as Washington Mutual. The system utilizes an ASK (Automated Switch Kit) Application that facilitates the automatic transfer of account information and protocols from an old bank account to a new bank account. The system leverages account aggregation functionality, inter-bank funds transfer capability, and alert functionality, among other things. Account aggregation refers to the consolidation of personal account data (e.g., bank accounts, investment, loans, mortgages, bills, etc.) into a single view screen (generally within an internet browser) using aggregation technology.

The ASK Application can determine services at an old bank account and facilitate the transfer of these services to a new bank account. The ASK Application contains code or functionality to determine bill pay payees at an old bank account and to add the bill pay payees to a bill pay service at a new bank account, including closing the old bank bill pay service if applicable. The ASK Application can determine bill pay payments at the old bank account and add the bill pay payments to the new bank account's bill pay service, including canceling payments scheduled on the old bank account service, if applicable. The ASK Application can also determine scheduled transfers or variable payment instructions at the old bank account and move the same schedule to the new bank account, if applicable, or create output to allow for customer decision regarding these transfers (e.g., schedule through inter-bank transfers). Similarly, the ASK Application can update bill pay information at third party sites, such as providing the account and routing numbers from the customer's new account to a third party site having the previous information.

In addition, the ASK Application can determine if any electronic bills ("eBills") are registered at or through the old bank account and can cancel registration at the old bank account before enrolling to receive the eBills at the new bank account. eBills refer to electronic copies of a bill from a payee. eBills are often delivered online either in addition to, or as a replacement for, a paper bill.

Furthermore, the ASK Application can identify payments likely to be paid (either monthly or other recurring time frames) from a credit or debit card associated with the old bank account, and can move these payments to the new account, and cancel the payments from the old bank account.

Also, the ASK Application can mine personal finance management data (PFM), such as data from applications such as Microsoft's Money or Intuit's Quicken. The PFM data could be used in addition to or in lieu of data obtained from other sources (e.g. financial institution web sites) to perform its functions (e.g. identify alerts, payments, transfers, ACHs, direct deposits, etc. . . . ). In addition, the ASK Application could provide the PFM software with the updated account information and access information.

The ASK Application can utilize techniques to facilitate the transfer of information and services. The ASK Application can evaluate the transaction history of an old bank account and create a report to evaluate likely automatic debits and credits, such as direct deposits, automatic billing through a debit card, and ACH (Automatic Clearing House) withdrawals. The ASK Application can also leverage output to automatically migrate transactions or to provide a customer or bank with recommended actions based on items reported. For instance, if a local power company has auto-debit on the old bank account, the ASK Application can provide customers with the phone number or URL where they can change to a new bank account. Such information can be accumulated for/from multiple third parties and provided to customers or bank employees or systems in a report. In addition, the ASK Application can monitor transactions on both the old bank accounts and the new bank accounts to report any suspected transaction clearings and take appropriate action. In one instance, if a Direct Deposit posts to the old bank account, the ASK Application could initiate an inter-bank transfer to move the Direct Deposit to the new bank account.

In some embodiments, the ASK Application accesses data from both public and privates sources (e.g., Experian, Lexis-Nexis, etc.) and compiles likely payments or other items needing migration regardless of the source. In some cases, depending upon the level of authorization from the customer, the application can utilize a soft or hard credit inquiry report to obtain the appropriate information (tradeline information).

In some embodiments, the ASK Application allows customers (including vendors/merchants utilizing the application) to participate in identifying certain transactional services to be switched by the ASK Application. For example, a wireless phone company could participate to ensure any scheduled payments from a mutual customer are updated to reflect the new account information without missing payment dates or disrupting service. The phone company may provide the ASK Application with descriptions of how their transactions should post on bank transaction records (e.g. "Major Wireless Auto-pay XXYYYY") to help identify the transactions and then to allow updates directly from the new bank on behalf of the customer to their billing information. The ASK Application may accept customer input from any of the channels the ASK Application interfaces for information, such as the Internet, Interactive Voice Response (IVR), call centers, and so on.

In addition to customers with personal accounts, in some embodiments the ASK Application supports and works with information related to small business and other commercial entities. The ASK application facilitates the transfer of information relating to electronic invoicing, electronic remittances, Delegate authorities, and other services designed for commercial use.

In an alternative embodiment, The ASK Application analyzes relationships and other information between the customer and products utilized by the customer. This allows the ASK Application to provide products and other services offered by the new institution (such as Washington Mutual), that may be desirable to the customer. In some instances, the ASK Application collects ancillary information (e.g. the rate offered on a savings account, the maturity date on CDs, and so on) and can provide the customer with desirable offerings based on the collected information. For example, the ASK Application creates a flag on the maturity date of a CD purchased by the customer at the previous institution. The application then uses the flag to alert the new bank when the CD approaches maturation, and the new bank can then provide a better offering to the customer.

The ASK Application may determine account set-up preferences for a customer, and facilitate the set-up of a new account based upon these preferences. For example, the Application may determine that a customer received only online bank statements from the old bank account and will facilitate the set-up the new bank account with this same service. (In this example, the customer may first need to take some action such as accepting an electronic consent agreement if he or she has not already.) Likewise, in some embodiments the ASK application gleans other information contained in an old bank account, such as check numbers previously used by the customer, and sets up the new bank account accordingly (e.g. order checks with a later starting number). In addition to preference and other information, the ASK application can also capture online documents associated with the customer from the old bank account, and transfer them to an electronic storage facility dedicated to the customer with the new account.

FIG. 1 and the following discussion provide a brief, general description of a suitable computing environment in which aspects of the invention can be implemented. Thereafter, details on embodiments of the invention are provided. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described herein may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

FIG. 1 illustrates a block diagram of the components of an ASK system for transferring account information and protocols from a BrandX financial institution to a new bank or financial institution. A customer 102 contacts the new bank through either a Financial Institution branch 104 (by direct, in-person interaction between customer and branch or by phone or fax with a branch), or a Call Center 106, or Internet Site 108 for the financial institution, to access a New Account Application 110. Once a new account has been opened, an ASK (Automated Switch Kit) Application 114 can be used to automatically transfer some or all of a customer's accounts from one or more previous financial institutions to the new bank. The ASK Application 114 obtains the customer's old or prior account information by contacting a BrandX Call Center 124 (through a Computer/Telephony Controller 120 and a PSTN (Public Switched Telephone Network) 122), or by contacting a BrandX Internet Site 118 (through an Internet 116), or mining data from other sources (e.g. PFM, credit reports, etc. . . . ) as explained below. The ASK Application may also receive data from other data sources 140, such as PFM, credit reports, publicly available information, etc.

If the old account information is masked or otherwise incomplete, the ASK Application 114 identifies the incomplete information and takes further steps as appropriate, such as prompting the customer to provide the complete information. For example, the ASK Application can identify that "****1234" is likely masked account number, and in response, prompt for customer intervention or additional information.

Once the ASK Application 114 has the account information from the BrandX financial institution, it updates the previously opened account at the new bank and generates an Aggregation/Exception Report 112 that reports exceptions to the scheduled payments to the new bank, as well as the cancellation of payments to BrandX financial institution. The ASK Application 114 may generate three separate reports 134 using three servers: a eBills/Payments Server 126, a Transfers/Wire Transfers Server 128, and an Alerts Server 130, which respectively generate one or more reports 134, such as a eBills/Payments Report, a Transfers/Wire Transfers Report, and an Alerts Report. Examples of data provided by the eBills/Payments Reports include the following: "payment could not be deleted/error", "payments deleted as requested", "payment frequencies did not match", and "verify new frequency" (e.g., BrandX sends payments on Saturdays and the new bank does not so move the payment to the next day). Examples of data provided by the Transfers/Wire Transfers Reports include the following: "transfer could not be deleted/error" and "wire transfer completed". Examples of data provided by the Alerts Reports include the following: "requested alert not canceled", "alert not available", and "alert method not recognized". All three reports 134 are sent to both the customer 102 (hard copy, to the customer's computer, or both) and to a back office computer 132 for processing.

In some embodiments, a customer verifies and authorizes the information contained in the reports 134 discussed above. For example, a customer may receive a report explaining that "bill payments A and B were deleted from BrandX bank and added to bill pay at [new bank], and transfers C and D were deleted from BrandX bank and added to transfers at [new bank]." The customer then verifies the information to be true and authorizes the ASK Application to finalize the switch described in the report.

In some embodiments, the report flags obtained information requiring further customer input (e.g. masked or incomplete account information).

Although the output of information has generally been described with respect to reports, the ASK Application 114 is able to disseminate information to many sources in a variety of formats, such as in a data feed to a dynamic marketing system, in addition to the report format discussed above. The ASK Application 114 works with end users receiving the output information, and may send the information in either batch or real-time modes. In addition, the Application can configure the batch modes individually for each received system or end user (one system may received a report batch every minute while another may receive a report batch daily).

In one embodiment, the ASK Application 114 obtains electronic payee data and other information from the customer's old bank account using a screen scraping function, which captures data from a system via its display. Other methods are of course possible. For example, a company such as CheckFree (http://www.checkfree.com/) provides many banks with electronic bill paying functions. Thus, the ASK Application could access CheckFree databases to automatically gather old account data electronically, and transfer this data to new account records stored in the new bank's databases.

The ASK Application 114 monitors the new customer's old bank account by automatically and periodically logging onto the old bank account website using the customer's old credentials (e.g. username and password) with that site. The time period for logging onto the old bank account can be customized to provide the best service. If the old bank account posted its ACH (Automatic Clearing House) transfers and direct deposits at a certain time each day, then the ASK Application 114 could be programmed to monitor the old bank account immediately following that time to give the customer maximum time to react. One embodiment leverages the services of an aggregation technology company, such as Yodlee (http://corporate.yodlee.com/), to enhance the current aggregation functionality of the ASK Application 114. A company such as Yodlee could provide the type of development needed for the proper aggregation or screen scraping pieces of the ASK Application 114. External companies that could enhance aspects of the system would include companies proficient in account aggregation technology (e.g., Yodlee, CheckFree, and S1), inter-bank transfers functionality and ACH functionality (e.g., CheckFree, CashEdge), and Alert functionality (e.g., KANA, Google Alerts, MSN Alerts, Yahoo Alerts, eBay Alerts). These companies or other companies proficient in similar fields could enhance the capabilities of the system by providing development and specific expertise into functional components of the ASK Application 114. The ASK Application 114, therefore, is able to aggregate information and eBills from multiple sites (e.g. online bill pay sites, brokerages, and so on) and perform a single switch request to obtain the information at the multiple sites.

The ASK Application 114 may employ speech recognition to gather information from the BrandX Call Center 124 via IVR (Interactive Voice Response). The use of speech recognition, which provides IVR scraping capabilities, may provide a cheaper and faster way to obtain daily balance updates by scraping information from IVRs instead of from the Internet. In addition, IVRs provide fewer navigation options, allowing IVRs to be more easily maintained and navigated from a system perspective.

In an alternative embodiment, the ASK Application 114 may employ optical character recognition (OCR) to gather information on the BrandX account. OCR utilizes an optical scanner for reading text, and software for analyzing scanned images. The optical scanner could scan a statement and analyze the scanned statement for information such as direct deposits or ACH transactions that may be missed from a human reviewing the account manually. In addition, if a customer was uncomfortable with the new bank checking their old accounts at BrandX financial institution, OCR could be used to review past statements without checking the old accounts at BrandX financial institution. Also, the input/output could be the scanning of known bills or statements to automate or pre-populate bill pay or form letters for the customers to send to terminate services elsewhere or to help automatically input data to the new account for new items.

In some cases, the ASK Application 114 works within the Open Financial Exchange (OFX) specification, and utilizes OFX methods to gather information from BrandX accounts and submit information to new accounts.

The BrandX Bank may attempt to stop the ASK Application 114 from transferring account information from its online account to the new bank's online account. By monitoring exception reports (e.g., data scrape failed "x" times) and by keeping monitoring accounts at BrandX Bank and monitoring those accounts for changes, the ASK Application 114 can avoid blocking. If BrandX Bank uses variable log-on credentials (e.g., a random identifier selected from a list of ten identifiers), the ASK Application 114 can detect the requested information and accurately provide it. Other blocking mechanisms, such as words embedded in images, can be overcome by real-time prompting to employees at the back-office computers 132 to complete the information. In an alternative embodiment, some or all of the functionality of the ASK Application 114 runs as a client application on the customer's computer and gathers the relevant information from BrandX Bank, and then provides the gathered information to the new bank server computer. The client application may be downloaded from the new bank's server computer when the new account is established.

Aspects of the invention may be practiced in a variety of other computing environments. For example, referring to FIG. 1, a distributed computing environment with a web interface includes one or more user computers, each of which includes a browser program module that permits the computer to access and exchange data with the Internet 116, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives). User computers may include other program modules such as an operating system, one or more application programs (e.g., word processing or spread sheet applications), and the like. The user computers can include wireless computers, such as mobile phones, personal digital assistants (PDA's), palm-top computers, etc., which communicate with the Internet via a wireless link. The computers may be general-purpose devices that can be programmed to run various types of applications, or they may be single-purpose devices optimized or limited to a particular function or class of functions.

At least one server computer (126/128/130), coupled to the Internet or World Wide Web ("Web"), performs much or all of the functions for receiving, routing and storing of electronic messages, such as web pages, audio signals and electronic images. While the Internet is shown, a private network, such as an Intranet may likewise be used herein. The network may have a client-server architecture, in which a computer is dedicated to serving other client computers, or it may have other architectures such as a peer-to-peer, in which one or more computers serve simultaneously as servers and clients. A database or databases coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer (126/128/130) may include a server engine, a web page management component, a content management component and a database management component. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as financial information.

Figure 2:
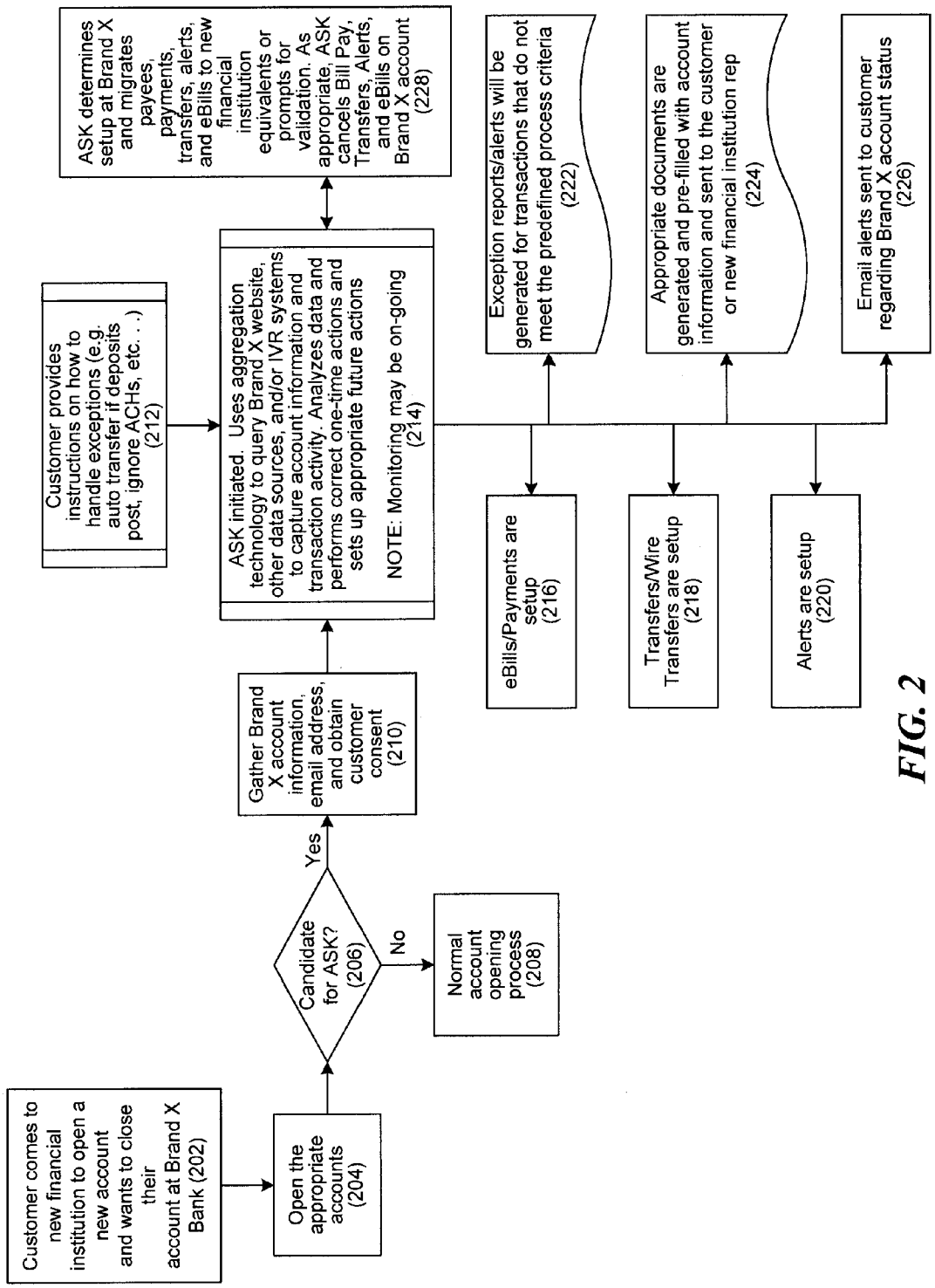
FIG. 2 illustrates a workflow or data diagram of the system of FIG. 1 for transferring account information and protocols.

FIG. 2 illustrates a block diagram of the workflow of an ASK system for transferring account information and protocols from the BrandX financial institution to the new bank. A customer comes to the new bank to open a new account and wants to close his or her account at BrandX financial institution (block 202). (Note: it is not a required condition to utilize the ASK system to transfer some of the services from BrandX to the new bank.) The new bank opens the appropriate accounts (block 204). For the purpose of explaining the workflow of the ASK system, an example will be used to illustrate certain concepts. The example is not meant to be definitive or all encompassing. In one embodiment, a customer comes to the new bank to open a new bank account and to close their bank account at BrandX Bank. The new bank performs the normal account opening operations and offers to help the customer move and close out their BrandX bank accounts.

The new bank determines whether the customer is a candidate for the ASK Application (block 206). If the customer is not a suitable candidate, then a normal account opening process occurs (block 208). Under the example, the customer agrees, so the new bank performs an assessment on the customer's old BrandX bank account and determines that the customer would benefit from using the ASK Application.

Where the customer is a suitable candidate, then the ASK system proceeds with the gathering of BrandX account information (including authentication information for BrandX IVR or internet banking applications), customer contact information (e.g., email address, pager, cell phone), and customer consent (block 210). Under the example, the new bank starts the ASK Application and has the customer sign any required documents to open a new account and legally provide access to the old account.

Once the ASK system is initiated, the ASK system may use aggregation technology to query the BrandX Internet Site, other data sources, or an IVR (Interactive Voice Response) system (including using voice/speech recognition technology) to capture account information and transaction activity (block 214). The ASK system also analyzes data, performs correct one-time actions, and establishes appropriate future actions (block 214). Thus, once the ASK Application starts, it goes to the online banking site of BrandX and uses the customer's provided credentials (e.g. User ID, challenge question, and password), and determines that the customer is using a BrandX scheduled transfer service, bill pay, eBills, and has Direct Deposits and ACH withdrawals from the BrandX bank accounts. In addition to traditional User ID and password credentials, the ASK Application utilizes and supports ancillary credentials, including: federated ID management, digital ID management, random log-on questions and answers, tokens, cookie based IDs, one-time password systems (either time based or usage based systems) issued by software or hardware, $2^{nd}$ channel authentication and other open-source or proprietary authentication methods.

The ASK Application can create a User ID and password for the customer or the customer can log in without providing the data for a one-time evaluation only without monitoring (as explained herein).

Next, the ASK system establishes eBills/Payments (block 216), transfers/wire transfers (block 218), and alerts (block 220). The ASK Application determines setup at BrandX and migrates payees, payments, transfers, alerts, and eBills to equivalents at the new bank or prompts for validation (block 228). In other words, the ASK Application sets up the same payees on the new bank's bill pay service, adds the scheduled payments to the new bank, and cancels the payments on the BrandX bank account, reporting any exceptions and asking the customer to review and approve the changes. The ASK Application then determines that some scheduled transfers exist, reports on the existing transfers, and migrates the existing transfers to mapped accounts at the new bank (e.g., scheduled transfer of $50/month from checking to savings at BrandX is cancelled and a recurring transfer is set up at the new bank from the customer's new checking account to the customer's new savings account). The ASK Application determines that the customer is enrolled to receive some eBills under the BrandX bank account and cancels those eBills at the BrandX bank account before enrolling the customer using the new bank's corresponding service, reports any exceptions, and prompts for any additional information that may be needed. Examples of exceptions that could be reported include a message indicating that an eBiller requires some sort of additional task to be completed to unenroll (e.g., a phone call, e-mail, PIN number, or a code from the last statement).

Appropriate documents are generated, pre-filled with account information, and sent to the customer or new bank representative (block 224). Thus, continuing with the example, the ASK Application analyzes the BrandX transaction history and notes that there are two direct deposits (one Social Security deposit and one Company A deposit) and one automatic withdrawal (from MajorPUD). The ASK Application recognizes the Social Security and MajorPUD transactions, provides specific instructions on how to properly notify those entities of the new accounts, and provides more generic instructions on how to resolve the Company A direct deposit, including pre-printing forms, providing phone numbers, or providing URLs.

The ASK Application then prompts the customer to determine if it should monitor the new and/or old accounts for these or other transactions, for a specified duration, and what action needs to be taken (block 214). In the example, the customer determines that she will request all the services to be moved over from their respective institutions, but also wants the ASK Application to monitor things, and, if either direct deposit posts to the old account, to transfer the money to the new bank account. If the MajorPUD transaction posts, the customer would like to be contacted and asked what action to take (block 220). The customer leaves the bank, closes their internet session, or hangs up if the ASK Application is initiated through a back-office process and/or the back office calls the customer.

A customer can provide instructions on how to handle exceptions (block 212). For example, the customer may try to change a Direct Deposit for Company A, but is told that Company A's next Direct Deposit will still go to the BrandX bank account. The customer then contacts the new bank under this example and asks that the new bank not transfer that amount when the next transaction occurs. The new bank notes the customer's request and sets up a flag in the ASK Application to not transfer the next direct deposit from Company A, but to continue to process the previously requested transactions, and in this example, to transfer the Social Security amount and to notify the customer if it detects any other direct deposit transfers from Company A.

Exception reports/alerts are generated for transactions that do not meet the predefined process criteria (block 222). For example, again continuing with the above example, the ASK Application monitors the BrandX bank accounts and the new bank account and detects an unlisted ACH transfer in the BrandX bank account. Since the ASK Application has not been prompted with how to handle this situation, the ASK Application prompts the new bank and asks how to handle these transactions in the future. The new bank contacts the customer and asks how she would like to handle the situation. The customer elects to do nothing and to ignore those particular ACH transactions in the future.

E-mail, SMS, voicemail, or other alerts are sent to the customer and/or the new bank back offices regarding the status of the BrandX account (block 226). The ASK Application continues to monitor transactions and later determines that the BrandX bank account has reached a negative balance and sends an alert. The ASK Application continues to monitor the BrandX bank account and determines that it has had the same balance for "X" days. The ASK Application sends an alert to notify that it appears that all transactions have cleared the account and that it may be safe now to close the account.

The above mentioned examples represent sample use cases meant to illustrate some of the ways that the ASK Application might function for the given scenarios and is not meant to be all encompassing or definitive. Other options could be presented or available at any of the above mentioned steps.

In an alternative embodiment, the ASK Application could apply to other types of financial institutions that may not technically be banks, as well as to small businesses or commercial account switches. In some case, the ASK Application interacts with brokerage accounts, credit card accounts, and other non-traditional financial services, such as eTrade, PayPal, ING, Countrywide, and so on.

In an alternative embodiment, the ASK Application supports and collaborates with other switching systems. The ASK Application also can be modified to incorporate new switching methods and systems, such as NACHA's proposed switch process. (NACHA is an industry organization developing specifications, which an industry developer may use to develop interfaces between systems.)

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while certain workflows for the ASK Application are provided, alternative embodiments may employ different modules, blocks or functions to achieve similar functionality or results. Additionally, while the ASK system is shown as having certain hardware components in FIG. 1, additional or alternative components may be provided (such as a single server, rather than, for example, the three servers 126, 128 and 130). While processes or blocks are at times shown as being performed or linked in series, these processes or blocks may instead be performed or connected in parallel.

Words in the above Detailed Description using the singular or plural number may also include the plural or singular number respectively, where the context permits. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein can be applied to other systems, not necessarily the system described herein. These and other changes can be made to the invention in light of the detailed description. The elements and acts of the various embodiments described above can be combined to provide further embodiments. Any patents, applications or other references, including any that may be listed in the accompanying filing papers, are incorporated herein by reference.

These and other changes can be made to the invention in light of the above detailed description. While the above description details certain embodiments of the invention and describes the best mode contemplated, no matter how detailed the above appears in text, the invention can be practiced in many ways. Details of configurations, functions, etc. may vary considerably in implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for such aspects of the invention.

We claim:

1. A system for facilitating automatic transfers of user account information from a first transaction account to a second transaction account, the system comprising:
    a first subsystem configured to access, over at least one network, a first transaction account of a user via a server associated with a first financial institution;
    a second subsystem configured to gather, from the first transaction account at the first financial institution, information related to at least one payment transaction associated with the first transaction account; and
    a third subsystem coupled among the first subsystem and the second subsystem, wherein the third subsystem is configured to access a server associated with the first financial institution and automatically transfer at least some of the gathered information related to the at least one payment transaction to a second transaction account at a second financial institution that is different from and independent of the first financial institution.

2. The system of claim 1, wherein the gathered information comprises payee information.

3. The system of claim 1, wherein the at least one payment transaction comprises at least one electronic bill payment transaction, and the gathered information comprises electronic bill data for the at least one electronic bill payment transaction.

4. The system of claim 1, wherein the at least one payment transaction comprises a recurring payment transaction.

5. The system of claim 1, further comprising:
    a fourth subsystem configured to generate at least one electronic message relating to at least one of a status of the transfer of the at least one payment transaction to the second transaction account.

6. The system of claim 5, wherein the at least one electronic message is one of an email, a SMS message, and a voice message.

7. The system of claim 5, wherein the at least one electronic message is sent to a mobile electronic device.

8. The system of claim 1, wherein the first transaction account comprises at least one of a bank account, an online payment service account, a credit account, and a brokerage account.

9. The system of claim 1, wherein the third subsystem is further configured to cancel a first scheduled payment from the first transaction account.

10. The system of claim 1, wherein the third subsystem is further configured to schedule a second payment corresponding to the cancelled first scheduled payment from the second transaction account.

11. A method in a computing system for facilitating the automatic transfer of information to a user account, the method comprising:
    at least one of a plurality of computer processors accessing data associated with a first transaction account held by a user with a first financial institution;
    at least one of the plurality of computer processors gathering at least some information related to the user from the first transaction account, wherein the gathered information includes information regarding at least one electronic bill payment transaction associated with the first transaction account; and
    at least one of the plurality of computer processors forwarding the gathered information for insertion into appropriate data fields of a second transaction account for the user with a second financial institution unrelated to the first financial institution.

12. The method of claim 11, wherein the at least one electronic bill payment transaction comprises electronic bill data for the at least one electronic bill payment transaction.

13. The method of claim 11, further comprising:
    at least one of the plurality of computer processors generating at least one electronic message relating to at least one of a status of the transfer of the at least one electronic bill payment transaction to the second electronic account.

14. The method of claim 13, wherein the at least one electronic message is one of an email, a SMS message, and a voice message.

15. The method of claim 13, wherein the at least one electronic message is sent to a mobile electronic device.

16. The method of claim 11, wherein the first electronic account comprises at least one of a bank account, an online payment service account, a credit account, and a brokerage account.

17. The method of claim 11, further comprising:
    at least one of the plurality of computer processors canceling a scheduled payment from the first electronic account for an electronic bill associated with the at least one electronic bill payment transaction.

18. The method of claim 17, further comprising:
    at least one of the plurality of computer processors scheduling a payment from the second electronic account for the electronic bill associated with the at least one electronic bill payment transaction.

19. The method of claim 11, wherein the at least one electronic bill payment transaction comprises a recurring electronic bill payment transaction.

20. The method of claim 11, further comprising:
    at least one of the plurality of computer processors providing the user with information regarding one or more products and services of the second financial institution that are competitive alternatives to the one or more products and services of the first financial institution employed by the user.

21. A computing system, comprising:

a component configured to automatically access a first account of a user at a first entity and gather information from the first account; and an automated switch kit configured to automatically migrate information regarding at least one payment transaction from the first account of the user at the first entity to a second account of the user at a second entity independent of and unaffiliated with the first entity.

22. The computing system of claim 21, wherein the component is further configured to automatically gather data associated with (a) an account held by the user with a third party merchant independent of the first and second entities, and (b) at least one payment transaction between the first account of the user at the first entity and the user's account with the third party merchant; and the automated switch kit is further configured to automatically identify the at least one payment transaction between the first account of the user and the third party merchant and migrate the at least one payment transaction and the user's account information with the third party merchant to the second account of the user at the second entity.

23. The computing system of claim 21, wherein the component is a first component, and wherein the system further comprises a second component configured to generate a report comprising information about the automatic migration of the at least bill payment transaction from the first account to the second account.

24. The computing system of claim 21, wherein the at least one payment transaction comprises at least one electronic bill payment transaction.

* * * * *